United States Patent [19]

Mohler

[11] Patent Number: 4,464,763
[45] Date of Patent: Aug. 7, 1984

[54] LASER OPTICAL MOUNT
[75] Inventor: Galen E. Mohler, Los Altos, Calif.
[73] Assignee: Lexel Corporation, Palo Alto, Calif.
[21] Appl. No.: 271,965
[22] Filed: Jun. 9, 1981
[51] Int. Cl.³ .............................................. H01S 3/08
[52] U.S. Cl. .................................... 372/107; 372/108; 350/288
[58] Field of Search ................... 372/107, 99, 29, 108; 350/288

[56] References Cited

U.S. PATENT DOCUMENTS

| | | | |
|---|---|---|---|
| 3,359,812 | 12/1967 | Everitt | 372/107 |
| 3,400,596 | 9/1968 | Liach | 372/107 |
| 3,478,608 | 11/1969 | Met | 372/107 |
| 3,700,313 | 10/1972 | Karr et al. | 372/107 |
| 3,781,709 | 12/1973 | Hintringer | 372/29 |
| 3,783,407 | 1/1974 | Mefferd et al. | 372/29 |
| 3,864,029 | 2/1975 | Mohler | 372/107 |
| 3,953,113 | 4/1976 | Shull | 372/107 |
| 3,987,373 | 10/1976 | Mohler | 372/107 |
| 4,087,766 | 5/1978 | Mohler | 372/99 |
| 4,201,951 | 5/1980 | Mohler | 372/107 |

FOREIGN PATENT DOCUMENTS 1246801 11/1979 United Kingdom ................ 372/107

Primary Examiner—William L. Sikes
Assistant Examiner—Léon Scott, Jr.
Attorney, Agent, or Firm—C. Michael Zimmerman

[57] ABSTRACT

A gas ion laser is described having a resonator structure which not only maintains the optical reflectors of the laser at the respective ends of the optical cavity in a selected relationship, it also maintains an optical element external of such laser in a predetermined relationship to the output beam of the laser. The resonator structure includes a plurality of rods which extend between mounts for the optical reflectors parallel to and adjacent the laser optical cavity. Such rods project beyond the one of the optical cavity mounts selected to hold a partially transmissive optical reflector to define the laser output beam, and terminate in a third mount which maintains a desired optical element in a predetermined relationship relative to the laser output beam.

6 Claims, 5 Drawing Figures

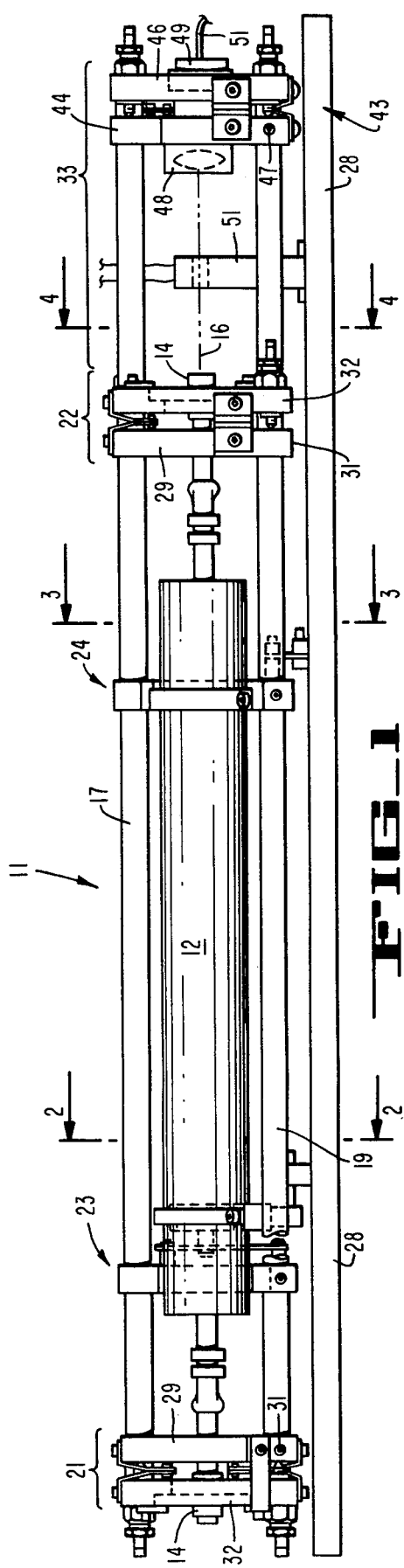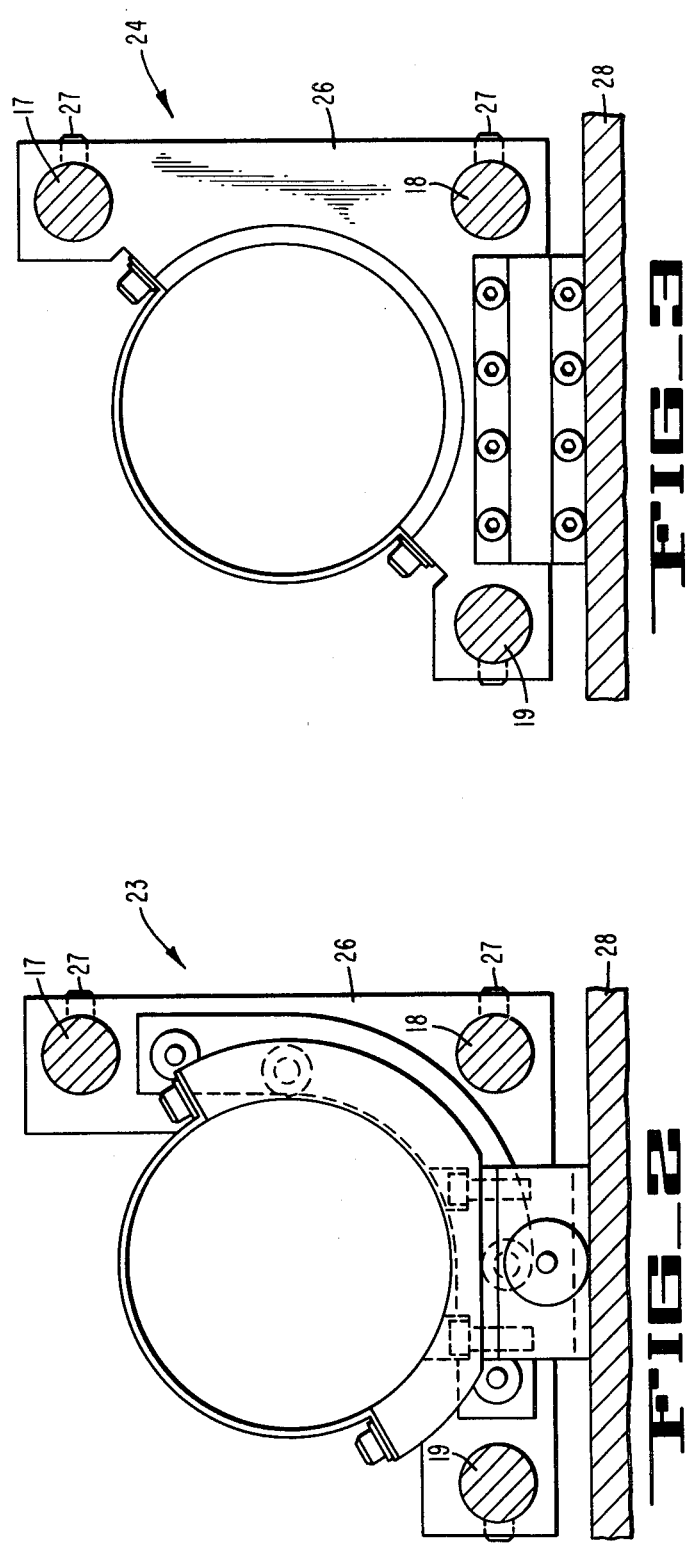

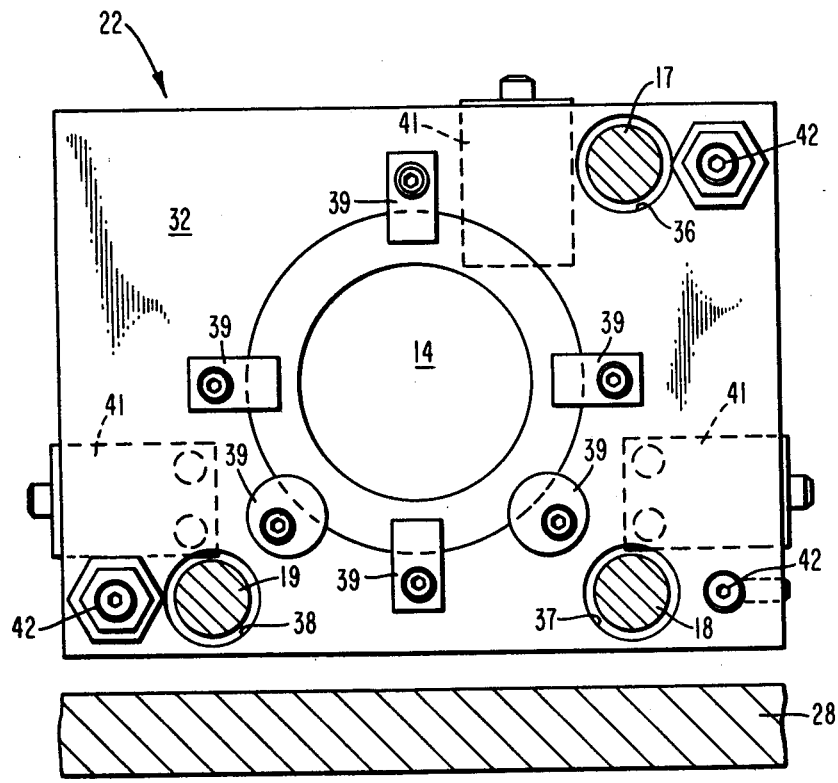
FIG_4
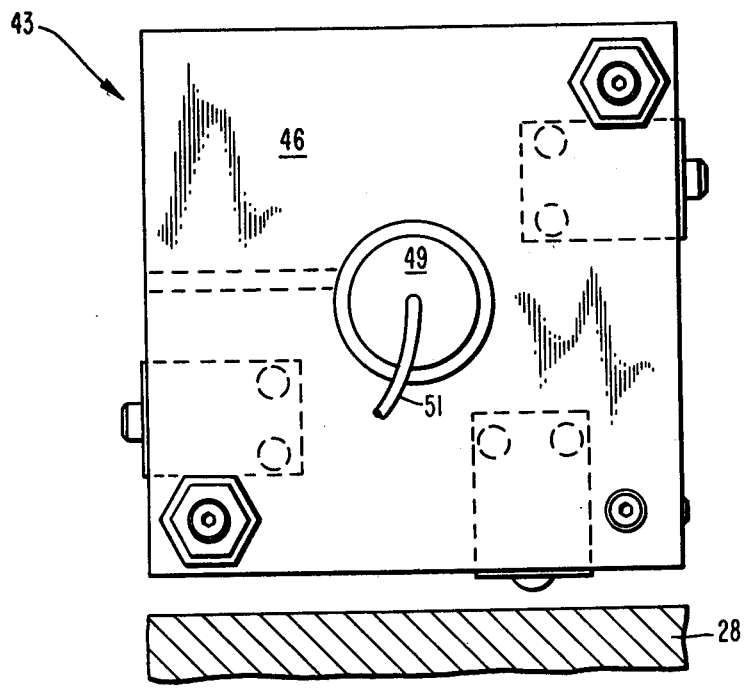
FIG_5

LASER OPTICAL MOUNT

BACKGROUND OF THE INVENTION

The present invention relates to lasers and, more particularly, to a resonator structure for the same which includes an arrangement for properly positioning an optical element outside the laser optical cavity.

In its basic aspects, an ion laser is made up of a lasable medium positioned between a pair of optical reflectors which reflect optical radiation emitted by the medium back-and-forth through the same to cause the stimulated emission of optical radiation. Typically, one of the optical reflectors is partially transmissive to permit optical radiation to escape from the laser optical cavity, and thereby form an output beam of coherent radiation.

It is important in achieving appropriate lasing action, that the optical reflectors of the laser be maintained in a selected, rigid and spaced-apart relationship relative to one another. Even slight changes in such relationship can result in power losses, output beam frequency changes, etc. It has therefore become the practice to provide a resonator structure which supports the mounts for the optical reflectors at their spaced apart locations. Such a resonator structure is carefully designed and made to maintain a rigid positional relationship between the optical reflectors, in spite of potential thermal distortions, limited vibrations, etc. Examples of resonator structures following a design which has been found to be particularly suitable, are described in U.S. Pat. Nos. 3,864,029; 3,966,309; 4,143,339; and 4,201,951 in which I am named as a sole or joint inventor. As described in these patents, the resonator structure design includes mounts for the optical reflectors maintained in a desired, predetermined relationship by a plurality of metal alloy rods extending parallel to the optical axis of the laser. Such rods are made of a material having a low coefficient of thermal expansion in the direction of the laser optical axis over the ambient temperature range to which they are expected to be subjected during operation of the laser. The metal alloy sold under the trademark INVAR, which is especially formulated to be dimensionally insensitive to thermal changes, is quite suitable.

Lasers are increasingly being used as sources of coherent radiation in products in which it is desired to maintain a set or closely adjustable relationship between the laser output beam and an optical element which receives it. For example, in eye photocoagulators utilizing laser coherent radiation, the output of an ion laser is typically focused to the receptor end of a fiberoptics strand or bundle. It is important in many of such uses that the relationship of the path of the laser beam relative to the optical element(s) be quite well defined and maintainable.

SUMMARY OF THE INVENTION

The present invention provides an arrangement for maintaining an element quite effectively in a desired relationship relative to laser radiation, in a relatively simple, yet quite effective manner. In essence, this element is incorporated into the resonator structure of the laser even though such element is located outside of the laser optical cavity (that is, exterior to the laser optical reflectors and the space therebetween). To this end, the laser resonator structure includes an extension which projects beyond the optical cavity. In the preferred embodiment in which the resonator structure is of the design set forth in the aforementioned patents, the extension simply comprises a projection of the resonator rods beyond one of the reflector mounts, and the support thereby of a third mount for the element. The third mount most desirably is similar to the optical cavity reflector mounts in that it includes a reference plate rigidly secured to the resonator structure, a mounting plate for the element, and means connecting such plates together for adjustment of their angular orientation relative to one another. The invention thus brings in a relatively simple way, the many years of research and development, the expense, etc. associated with laser resonator structure design, to the relationship of a laser to its external environment.

The invention includes other features and advantages which will be described or will become apparent from the following, more detailed description of a preferred embodiment.

BRIEF DESCRIPTION OF THE DRAWING

With reference to the accompanying two sheets of drawing:

FIG. 1 is a side elevational view of a preferred embodiment of the invention;

FIG. 2 is a sectional view taken on a plane indicated by the lines 2—2 of FIG. 1, showing one support structure for the laser resonator structure and tube assembly of the embodiment shown in FIG. 1;

FIG. 3 is another sectional view taken on a plane indicated by the lines 3—3 in FIG. 1, illustrating another support structure for the laser resonator structure and tube assembly of the FIG. 1 embodiment;

FIG. 4 is a sectional view taken on a plane indicated by the lines 4—4 in FIG. 1, illustrating an optical reflector mount of the resonator structure of the invention; and FIG. 5 is an end elevational view illustrating an optical mount incorporated as a part of the resonator structure extension of the invention.

DETAILED DESCRIPTION OF THE PREFERRED EMBODIMENT

A preferred embodiment of a gas ion laser incorporating the present invention, is illustrated in FIGS. 1-5. Laser 11 includes a plasma tube assembly 12. Although not illustrated, it will be recognized that assembly 12 includes not only the envelope (plasma bore tube) which contains a gaseous lasing medium, but also the anode and cathode electrodes, the magnet assembly, and coolant structure required to initiate and maintain efficient lasing operation. As is conventional, means (not shown) such as electrodes and a power source, are provided for initiating an electrical discharge in the lasable medium.

The lasing medium will include quantum resonant particles, such as are present in the ionized noble gases argon and krypton. Such a gas typically will be at a pressure within the tube of about one torr. Lasing action is sustained within a lasable medium by oscillation therethrough of optical radiation of the appropriate frequencies a sufficient number of times to sustain lasing action. The required oscillation of the radiation is achieved in accordance with normal practice, by the proper positioning of opposed optical reflectors (mirrors) such as is schematically represented by the optical reflector assemblies 14. Transmission of optical radiation as represented at 16 through one of the reflector assemblies, constitutes the coherent optical radiation output of the laser. In this connection, the term "optical radiation" as used herein is meant to encompass electromagnetic radiation both in the visible wavelength spectrum and in other wavelength spectrums, such as in the ultra-violet and infrared range, which follow the laws of optics and quantum mechanics responsible for lasing action.

The space between the mirror assemblies 14 through which optical radiation or energy is oscillated, is referred to herein and in the art as the optical cavity of a laser. Such optical cavity includes the interior of the tube assembly 12 containing the lasable medium and is otherwise most desirably enclosed to be maintained dust-free and isolated from the ambient atmosphere in order to reduce optical losses. In this connection, each window end of the tube assembly 12 positioned adjacent a mirror assembly 14 is communicated therewith by a tubular cover and ball joint arrangement of the type described and claimed in my U.S. Pat. No. 3,864,029, the disclosure of which is hereby incorporated by reference. The output path 16 of the laser as extended through the optical cavity is referred to herein as the optical axis of the laser.

It is quite important in sustaining a desired lasing action that the physical relationship of the mirror assemblies 14 relative to one another be maintained quite rigid and well defined. Laser 11 further includes a resonator structure for this purpose. It is designed to resist dimensional changes due to thermal and mechanical stresses. Such structure includes in this preferred embodiment, a plurality of (in this case, three) rods 17-19 supporting a pair of mounts 21 and 22 for the mirror assemblies 14. As illustrated, the rods 17-19 extend parallel to the optical axis of the laser and in end view are triangularly related to one another.

The material of the rods 17-19 is selected to have low thermal expansion at the direction of the laser optical axis over the ambient temperature range to which they are expected to be subjected during operation of the laser. While there are various materials having a low thermal coefficient of expansion suitable for such rods, it is preferred as stated previously that they be of the metal alloy sold under the trademark INVAR which is especially formulated to be dimensionally insensitive to thermal changes.

Rods 17-19 are maintained in their relative positions by a pair of support structures 23 and 24. As illustrated in FIGS. 2 and 3, each of such support structures includes an angled support holder 26 through which each of the rods 17-19 pass. And each of the rods 17-19 are rigidly secured to the respective holders 26 by set screws 27. An appropriate adhesive also can be used for this purpose. The support holders not only maintain the rods 17-19 of the resonator structure in dimensional relationship, they also add structural strength to the overall resonator structure to resist forces, such as torsion forces, which may cause distortion.

The support structures 23 and 24 also secure the plasma tube assembly in position in the optical cavity of the laser. As illustrated, such securance is via a clamp arrangement basically the same as that described in my U.S. Pat. No. 4,201,951 which permits limited axial movement of the tube assembly relative to the resonator structure. The disclosure of my earlier U.S. Pat. No. 4,201,951 is hereby incorporated by reference, and for conciseness such arrangements are not described herein in detail. The connection of the plasma tube assembly 14 to the support holder of support structure 23 is the same as that shown and described in connection with FIGS. 6 and 7 of such patent; and as illustrated, a simple, semi-cylindrical strap and cap screw arrangement secures the assembly to the support holder of structure 24.

Each of the support structures 23 and 24 also mount the resonator structure on a base for the laser in the form of a plate 28. The mounting structure for this purpose is illustrated in FIGS. 1, 2, and 3, and is essentially the same as that described in U.S. Pat. No. 4,201,951. The mounting structure used with support structure 23 is described in detail in connection with FIGS. 2 and 3 of such earlier patent, and that used with support structure 24 is shown in FIGS. 4 and 5 of such patent. The mounting structures cooperate to isolate the support structures 23 and 24 and, hence, the resonator structure, from any thermal expansion or limited mechanical vibrations of the base.

Each of the reflector mounts 21 and 22 of the resonator structure, are rigidly secured in position relative to the rods 17-19. In this connection, each of such mounts include a rectangular reference member in the form of a plate 29 inwardly of the optical cavity of the laser. The rods 17-19 extend into bores in the respective reference plates, and each is rigidly secured thereto via set screws 31 and a suitable adhesive. Each of the mirror assemblies is in turn rigidly secured to a mounting plate 32 of the respective mounts 21 and 22, which is connected to its associated reference plate by the leaf spring and separator arrangement disclosed in my U.S. Pat. Nos. 3,864,029 and 3,966,309, the disclosures of which are incorporated herein by reference. Such connecting arrangement enables the angular orientation of each mounting plate 32 and, hence, the mirror associated therewith, to be adjusted relative to its corresponding reference plate and, hence, the remainder of the resonator structure and the optical cavity. Thus, the orientation of each of the optical reflectors can be adjusted to appropriately tune the laser to obtain the desired frequency and power output.

In accordance with the invention, the laser further includes an extension of the resonator structure for the mounting of an optical element it is desired interact with optical radiation of the laser. Such extension, generally referred to in FIG. 1 by the reference numeral 33, projects beyond reflector mount 22. As mentioned previously, the projection of the laser resonator structure as reflected by extension 33 results in the rigidity and thermal insensitivity required for the mechanical positioning of the mirrors to also be advantageously utilized in positioning an optical element external of the laser.

Extension 33 is incorporated into the laser resonator structure most simply by merely projecting the rods 17-19 beyond optical mount 22. That is, whereas in a conventional arrangement the resonator structure would terminate with the mount 22, in this invention it is projected therebeyond by increasing the length of such rods beyond that necessary for defining the laser optical cavity, and taking the steps necessary to assure that such rods will not interfere with proper positioning and adjustment of the optical reflector assembly associated with mounting structure 22. With respect to the latter criteria, FIG. 4 illustrates the face of mounting plate 32 of mounting structure 22. It is provided with three bores 36-38 which extend therethrough and respectively register with and receive the rods 17-19. As shown, each of such bores has a diameter sufficiently larger than the diameter of its associated rod to enable limited angular adjustment and positioning of the plate 32 relative to the plane orthogonal to the planes defined by pairs of such rods. Keeper dogs 39 secure the optical reflector assembly 14 to the mounting plate 32, and the leaf springs and separator bolts which adjustably secure the mounting plate 32 to the reference plate 29 are respectively referred to by the reference numerals 41 and 42.

Extension 33 further includes a mount for an optical element to be supported. Such mount, generally referred to by the reference numeral 43, includes a reference member in the form of plate 44 and a mounting member in the form of a plate 46 (FIG. 5). Reference plate 44 is rigidly secured to the extensions of rods 17–19. This rigid securance is achieved by providing bores in plate 44 which receive the ends of such rods. Such rod ends are maintained in the bores in plate 44 with a suitable adhesive and set screws as represented at 47. Thus, plate 44 is rigidly secured to the remainder of the resonator structure extension at a predetermined location relative to the path 16 of coherent radiation which is emitted from the laser.

Mounting plate 46 is connected to the plate 44 via the same leaf spring and separator arrangement used to connect the mounting plates for the optical reflectors 14 of the support structures 21 and 22. Thus, the angular orientation of such plate 46 relative to plate 44 is adjustable.

As an example of an appropriate optical element which can be positioned by the extension of the invention, a focusing lens 48 is illustrated rigidly held by reference plate 44 in a predetermined location to appropriately intercept coherent radiation emitted by the laser and traveling on path 16. Lens 48 focuses the laser output radiation onto the receptor end assembly 49 of a light conveying device such as a light pipe or fiberoptic strand or bundle, represented at 52.

It will be recognized that the resonator structure of the invention is used in this preferred embodiment to appropriately position two optical elements, the focusing lens 48 and the receptor end assembly 49. Lens 48 is maintained rigid by the extension at a predetermined set location, whereas utilization of the mount 43 enables the angular orientation of the receptor end 49 relative to the radiation focused by lens 49 to be adjusted for optimum radiation reception. Thus, utilization of the mount 43 as part of the extension results not only in the structural advantages of the resonator structure being imparted to an optical element outside of the optical cavity of the laser, but also in the ability to adjust the angular orientation of an optical element relative to the laser output. In this connection, it should be noted that whereas in this example the optical element (lens 48) which directly receives the laser output is maintained in a rigid position relative to such output in view of its securance to reference plate 44, an optical element desired to receive the radiation directly can be appropriately mounted to the reference plate 46 to enable adjustment of its angular orientation as desired. In such an arrangement, a suitable transmission passage for the laser output beam is provided through reference plate 44 to enable the laser output to reach an optical element mounted on the mounting plate 46.

It should further be noted that both of the optical elements 48 and 49 are mechanically "passive", i.e., neither depends directly upon mechanical motion for interaction with optical radiation. Thus, neither will interfere with isolation of the laser optical cavity from mechanical vibration. It is desirable, though, in certain situations that an optical element that can cause mechanical vibration intercept the output radiation of a laser. An example of such an optical element is a solenoid actuated light shutter as is represented in FIG. 1 at 52. It will be recognized that each time the shutter block of such an arrangement is tripped, there can be a mechanical vibration which preferably is isolated from the optical cavity of the laser. As illustrated, shutter 52 is mounted on base plate 28, rather than resonator structure extension 33. Thus, the resonator structure (including the extension 33) will be isolated from any mechanical vibration caused by such movement, due to the manner in which such structure is supported on the base.

Although the invention has been described in connection with a preferred embodiment thereof, it will be appreciated by those skilled in the art that various changes and modifications can be made without departing from its spirit. For example, although the extension of the resonator in the preferred embodiment projects beyond the output end of the laser to appropriately position an optical element to receive the laser output, the principles of the invention are equally applicable to positioning an optical element at the other end of the laser 11. It is therefore intended that the scope of coverage afforded the instant invention be limited only by the language of the claims and its equivalent.

I claim:

1. In a laser having resonator structure supporting at spaced apart locations a pair of mounts for respectively positioning optical reflectors in a selected, rigid and spaced-apart relationship to define an optical cavity therebetween within which a lasable medium is positionable to generate lasing action; the improvement comprising means which is an integral part of said resonator structure extending said resonator structure beyond the one of said pair of mounts provided to position a partially transmissive optical reflector at the end of the optical cavity of said laser, in a direction away from the other of said pair of mounts, which means includes a third mount outside of said optical cavity and separate from said pair of mounts for supporting outside of said optical cavity, an element responsive to the optical radiation generated by said laser, said third mount being adjustable to change the orientation of said element relative to the path of radiation emanating from said end of said optical cavity.

2. A laser according to claim 1 further including a base; and mounting structure connecting said base to said resonator structure, isolating said resonator structure from thermal expansion and limited mechanical vibration of said base.

3. A laser according to claim 1 wherein said resonator structure includes a plurality of rods extending between said pair of mounts adjacent said optical cavity to maintain said mounts in a rigid and spaced apart relationship relative to one another, which rods are made of a material having a low coefficient of thermal expansion.

4. A laser according to claim 3 wherein said plurality of rods project beyond said one of said pair of mounts and said third mount includes a reference member which is rigidly secured to said rods at a predetermined location relative to the path of optical radiation emanating from said end of said optical cavity.

5. A laser according to claim 3 wherein said a third mount further includes a mounting member for said element, and means connecting said mounting member to said reference member for adjustment of the angular orientation of said mounting member relative to said reference member.

6. A laser according to claim 1 further including a plasma tube assembly having an envelope enclosing a gaseous lasable medium; and support structure securing said plasma tube assembly in the optical cavity of said laser accommodating differential thermal expansion between said plasma tube assembly and said resonator structure.

* * * * *